Feb. 6, 1934.   W. T. BIRCH   1,946,188
REGULATOR AND RELEASE VALVE
Filed April 8, 1931
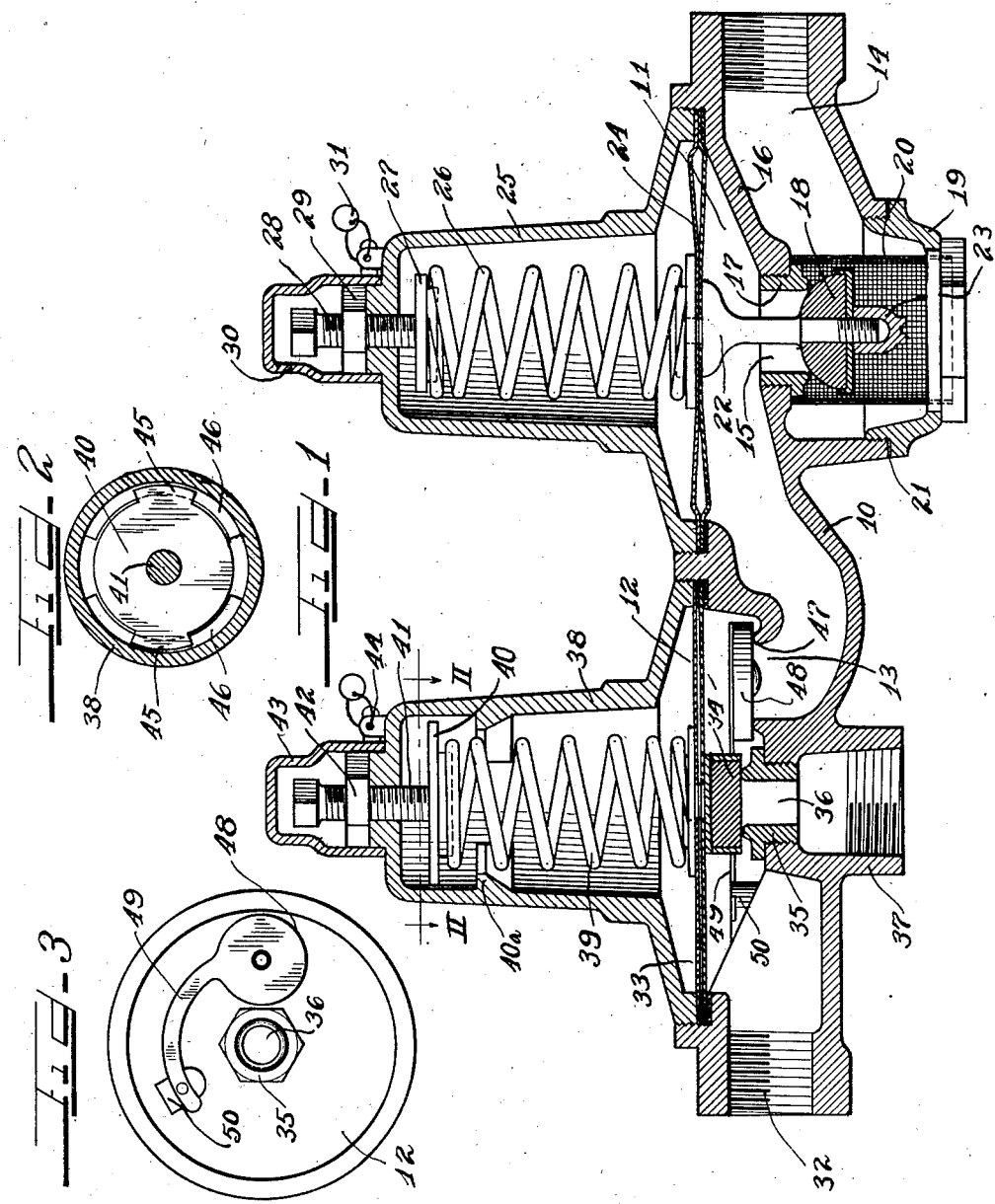
William T. Birch Patented Feb. 6, 1934

1,946,188

UNITED STATES PATENT OFFICE 1,946,188

REGULATOR AND RELEASE VALVE

William T. Birch, Chicago, Ill.

Application April 8, 1931. Serial No. 528,554

4 Claims. (Cl. 50—23)

The present invention relates to fluid pressure regulators and more particularly to regulators, such as are used in conjunction with pressure relief valves in closed hot water heating systems. By the use of such regulators and relief valves a constant pressure is maintained in the system below that of the supply pressure, the relief valves opening the outlet pressure to the atmosphere whenever expansion of the water, due to high temperature in the system, increases pressure therein above the safety or set point. After the water in the system cools so that the pressure falls below the set point the main or regulator valve permits the inflow of supply pressure so as to raise the pressure in the system to the set point.

Since in many systems of the above type expensive chemicals are used to soften the water and prevent scale, it is important that means be provided to prevent outflow and waste of the water from the system in case it becomes necessary to clean or replace parts of the regulating valve. It is also important that such means as are employed for the foregoing purpose be also capable of acting to prevent outflow of water from the system into the pressure supply pipe in case supply pressure for any reason falls below that within the system. The supply pipe to the regulator is usually also the drinking water supply to the household and any considerable amount of heating system fluid therein would obviously contaminate it to the extent of making it unfit for drinking purposes.

In addition theretofore to various and numerous objects relating to the mechanics of the fitting, the object of this invention is the provision of a regulator for the purpose stated which will avoid the above mentioned disadvantages; which will operate effectively and efficiently over long periods without adjustment or attention; which may readily be cleaned, and which will be safe and durable.

In the accompanying drawing, illustrating the invention and forming a part of this specification:

Figure 1 is a central vertical longitudinal section through the complete unit.

Figure 2 is a detail horizontal section taken on line II—II of Figure 1, and

Figure 3 is a detail top plan view outlet chamber with the head and diaphragm removed to show the check valve member.

Referring particularly to Figure 1, the regulator unit has a casing generally indicated at 10. This casing has in line two upwardly opening chambers, a low pressure chamber 11 and an outlet pressure chamber 12. These chambers are in communication with one another through a connecting channel 13 which it will be noted is of an area and shape to reduce friction and furnish an ample waterway.

At one end, the casing 10 has an inlet 14 into which a water service pipe is connected in use, such service pipe being provided with a cut-off valve so that the inlet pressure may be cut off when it becomes necessary to clean or replace any portions of the regulator.

The inlet 14 communicates with the low pressure chamber 11 through a vertical port 15 in the web 16 between the chamber and said inlet. In this port 15 centrally of the base of the chamber 11, a valve seat member 17 is threaded so as to be removable from below and normally present a downwardly directed valve seat for engagement by the regulating valve 18.

In vertical alignment with the port 15, the base of the casing 10 has an enlarged opening normally closed by a screw cap 19 adapted to normally support the lower end of a cylindrical screen 20. The casing 10 and cap 19 have engaging shouldered portions at 21 so that by means of a suitable gasket between the portions a watertight joint is assured. When the cap 19 is in position, as shown in Figure 1, the upper end of the screen 20 abuts the web 16 around the port 15 and thus the screen is effective under working conditions to filter such water as passes from the inlet 14 into the low pressure chamber 11.

The regulating valve 18 reciprocates vertically within the screen 20 and is secured around the lower end of a valve post or stem 22 by means of a lower nut 23 which is readily accessible when the cap 19 and screen 20 are removed, and may be renewed or adjusted without affecting the adjustment of the valve actuating means.

The valve post or stem 22 upstands through the port 15 and is rigidly secured at its upper end centrally of the regulator diaphragm 24 which forms the top of the low pressure chamber 11. The diaphragm 24 is preferably made of two pieces of sheet metal as shown so as to assure operation in the event of failure of one piece. The peripheral edge of this diaphragm is seated in connection with a suitable sealing gasket on an annular ledge of the casing and clamped secure in place by the threaded lower flared end of an upstanding hood 25. Each piece of metal is dished, as shown, and the two pieces are clamped together at their center to the stem 22.

The hood 25 houses the regulating spring 26 whose lower end engages the upper surface of the diaphragm at its center and upon whose upper end a plate 27 is seated. This plate in turn is engaged by the lower end of a regulating screw 28 mounted vertically through the upper end of the hood 25. The outer portion of screw 28 is engaged by a lock nut 29 and, with this nut, is covered by a cap 30 which protects the same and may, by a seal 31, prevent unwarranted tampering.

At the other end of the casing 10, an outlet 32, connected in practice with the hot water system, opens directly into the outlet pressure chamber 12 whose top is formed by a double diaphragm 33. Centrally of the lower face of this diaphragm a valve 34 is fixed to normally engage the upwardly directed seat of a valve seat member 35.

The seat member 35 is threaded in a port 36 in the casing base centrally of the base of the chamber 12 and in communication with an internally threaded relief pipe connection 37 from which a suitable relief pipe may lead to any desired point of disposal. Such pipe is, of course, open to the atmosphere.

The diaphragm 33 is clamped in connection with a suitable gasket to an annular shouldered seat of the casing around the upper portion of chamber 12, by the lower threaded and flared end of a hood 38. This hood houses a relief spring 39 whose lower end engages the diaphragm to normally hold the valve 34 seated. The upper end of the spring is engaged by a plate 40 and this plate is, in turn, engaged by the inner lower end of an adjusting screw 41 threaded through the top of the hood 38. A stop 40ª limits the movement of the plate 40 and consequently limits the compression of the spring 39 and thus the pressure in the heating system is limited. A lock nut 42 on the exterior portion of the screw 41 serves to hold the same in adjusted position, and a cap 43 covers and protects the screw and nut. This cap may be secured by a seal 44.

It will be noted that the plate 40 engaging the relief valve spring 39 has diametrically outstanding wings 45, as best seen in Figure 2. It will also be seen in Figure 1 that the hood 38 has arcuate internal shoulders 46, the spaces between which permit of passage of the plate wings 45 upwardly past the shoulders. When turned through 90°, however, the movement of the plate 40 is limited in a downward direction by the shoulders 46 and these shoulders are so placed in the hood 38 that increase of pressure on the valve 34 is limited as the parts appear in Figure 1 to approximately thirty-five pounds.

Thus under normal conditions of installation, the relief valve 34 must open at some set pressure not greater than approximately thirty-five pounds to which the adjustment of its controlling spring is, by the above means, limited. In some instances where it is necessary to increase this pressure, it is possible to exchange the spring engaging plates 27 and 40, since plate 27 will move freely between the shoulders 46 and the hood 25 of the regulating valve housing has nothing internally thereof to check the plate 40 with its wings 45.

At the end of the connecting channel 13 between the chambers 11 and 12, an upwardly presented valve seat 47 is formed within the chamber 12. On this seat a check valve 48 is adapted to seat and check outflow of fluid from the heating system. This check valve is thus located between the relief valve 34 and the main regulat valve 18 and its action is in a sense independent of the action of both the relief and regulating valves as we shall see.

The check valve 48 is secured to one end of a flat spring arm 49 which, as seen in Figure 3, is curved to clear the relief valve and is anchored at its opposite end to a boss 50 upstanding from the base of the outlet chamber 12.

Thus, if for any reason pressure in the supply connections to the regulator falls below the set pressure in the heating system to which the outlet 32 is connected, the check valve 48 will automatically seat itself and prevent backflow of fluid from the system. This is true in case of failure of pressure in the supply connections as well as when pressure is cut off therein preparatory to removing the regulator valve 18 for adjustment, cleaning or substitution of parts.

Under normal circumstances, with the controlling springs 26 and 39, properly set, water is admitted into the heating system through the regulator, by opening the usual cut-off valve in the supply connections. Water continues to flow into the system until sufficient pressure, usually ten to fifteen pounds, builds up therein whereupon this pressure acting against the lower face of the diaphragm 24 overcomes the pressure of spring 26 and closes the regulating valve 18. No more water will then enter the system until such time as the relief valve 34 has opened, due to increase in pressure in the system by the expansion of the highly heated water. When such excess expansion pressure has been relieved by exhaustion of water through the relief valve, and the system again cools off, if pressure therein is below the set pressure of the regulating valve, the latter will again open to admit a further supply of water into the system.

It will be obvious that, since the diaphragm 24 is formed of two oppositely directed dished members of sheet metal secured at their margins and clamped together at their centers to the valve stem in the manner shown in Figure 1, the valve 18 is reciprocated with a snap action.

I am aware that numerous details of construction may be varied through a wide range without department from the principles of this invention, and I therefore do not purpose limiting the patent granted otherwise than necessitated by the prior art.

I claim as my invention:

1. In a pressure regulator comprising a casing having an inlet and an outlet and having a valve adapted to close said inlet, means for actuating said valve, said means comprising a diaphragm formed of a pair of similar and oppositely directed dished thin metal members, a valve stem for said valve, and means clamping said thin metal members together at their center and to said valve stem.

2. A water pressure regulator comprising a casing having a first shallow dished portion and a second shallow dished portion and having a passaged neck extending between said first and second portions, a closure member on each of said first and second portions defining a first chamber and a second chamber therewith, means defining a water inlet for said first chamber, a spring pressed diaphragm in said first chamber, a valve connected to said diaphragm to control the inlet, said passaged neck providing a water inlet for said second chamber, means in said second chamber adapted to close said last-named inlet against counterflow of water therethrough, said means comprising a flat valve and a longitudinally curved resilient arm secured to said casing and to said flat valve adapted to normally position said valve in seated position to close said last-named inlet.

3. In a valve having a movable element, means connected to actuate said element with snap action thereof, said means comprising oppositely directed concaved resilient members arranged in pairs and means retaining said members in secured relation to each other at their central portions and connected to the movable element.

4. In a valve having a movable element, means connected to actuate said element, said means comprising a pair of oppositely directed resilient diaphragms, and means clamping the central portions of said diaphragms together to produce a depressed central portion of said diaphragms.

WILLIAM T. BIRCH.